United States Patent
Wu et al.

(10) Patent No.: US 7,450,407 B2
(45) Date of Patent: Nov. 11, 2008

(54) CONTROL METHOD OF AC/DC POWER CONVERTER FOR INPUT CURRENT HARMONIC SUPPRESSION

(75) Inventors: Chin-Chang Wu, Kaohsiung (TW);
Hung-Liang Chou, Kaohsiung (TW);
Min-Sheng Huang, Kaohsiung (TW);
Wen-Jet Hou, Kaohsiung (TW)

(73) Assignee: UIS Abler Electronics Co., Ltd., Taipei Hsien (TW)

( * ) Notice: Subject to any disclaimer, the term of this patent is extended or adjusted under 35 U.S.C. 154(b) by 275 days.

(21) Appl. No.: 11/332,376

(22) Filed: Jan. 17, 2006

(65) Prior Publication Data

US 2006/0244426 A1 Nov. 2, 2006

(30) Foreign Application Priority Data

Apr. 29, 2005 (TW) .............................. 94113906 A

(51) Int. Cl.
*G05F 1/565* (2006.01)
*H02M 5/44* (2006.01)

(52) U.S. Cl. ........................... 363/89; 323/207; 323/222

(58) Field of Classification Search .................... 363/89, 363/80, 44, 79, 81; 323/207, 222, 208–211
See application file for complete search history.

(56) References Cited

U.S. PATENT DOCUMENTS

| 5,861,734 | A | 1/1999 | Fasullo et al. |
| 5,969,515 | A | 10/1999 | Oglesbee |
| 6,034,513 | A | 3/2000 | Farrington et al. |
| 6,049,473 | A | 4/2000 | Jang et al. |
| 6,108,221 | A * | 8/2000 | Takada et al. .................. 363/41 |
| 6,191,565 | B1 * | 2/2001 | Lee et al. ...................... 323/222 |
| 6,268,716 | B1 | 7/2001 | Burstein et al. |
| 6,307,361 | B1 * | 10/2001 | Yaakov et al. ................ 323/288 |
| 6,388,429 | B1 | 5/2002 | Mao |
| 6,400,586 | B2 * | 6/2002 | Raddi et al. .................... 363/37 |
| 6,556,464 | B2 * | 4/2003 | Sakai et al. .................. 363/132 |
| 6,650,554 | B2 | 11/2003 | Darshan |

* cited by examiner

*Primary Examiner*—Jeffrey L Sterrett
*Assistant Examiner*—Harry Behm
(74) *Attorney, Agent, or Firm*—Bacon & Thomas, PLLC

(57) ABSTRACT

A harmonic-suppressing AC/DC power converter employs a control method for permitting the AC/DC power converter only to detect an input AC current and an output DC voltage. The control method can control the AC side of the AC/DC power converter to generate a voltage which is proportional to the input AC current. Thereby, the AC/DC power converter acts as a virtual resistor having a linear resistance characteristic. Accordingly, the input AC current of the AC/DC power converter can be controlled to approximate nearly as a sinusoidal wave with the performance of high input power factor and low input harmonic current.

2 Claims, 7 Drawing Sheets

CONTROL METHOD OF AC/DC POWER CONVERTER FOR INPUT CURRENT HARMONIC SUPPRESSION

BACKGROUND OF THE INVENTION

1. Field of the Invention

The present invention relates to a control method of an AC/DC power converter for input current harmonic suppression. More particularly, the present invention relates to the control method for applying to the AC/DC power converter without detecting an AC voltage so as to adjust an input AC current to approximate nearly as a sinusoidal wave and to obtain an unity power factor, and to supply an output of an adjustable DC voltage.

2. Description of the Related Art

Power converters have been widely used in many areas recently. These power converters include AC/DC, DC/DC and DC/AC converters. Conventionally, the AC/DC power converter is configured by a diode rectifier. There are advantages of simplified configuration and reduced cost in using the diode rectifier. However, a DC side of the diode rectifier cannot be controlled, and a great amount of input harmonic components and poor input power factors occur in its AC side.

In order to improve the problems of harmonic pollution effectively, many harmonic control standards, such as IEEE519-1992, IEC1000-3-2, and IEC1000-3-4 etc., have been established. In this way, the modern power electronic equipment need to meet the requirements for low input harmonic distortion and high input power factor. Recently, a variety of power factor correctors are developed to solve the harmonic problems caused by the AC/DC power converter.

Referring to FIG. 1, a schematic circuitry of a conventional power factor corrector is illustrated. Generally, the power factor corrector includes a diode rectifier 10, an inductor 11, a power electronic switch 12, a diode 13, a DC capacitor 14 and a controller 15. Control methods for the power factor corrector are well known and described in U.S. Pat. No. 6,650,554 and U.S. Pat. No. 6,388,429, for example. The output DC voltage of the power factor corrector can be controlled by controlling the power electronic switch 12. The output DC voltage of the power factor corrector is higher than a peak value of an input AC voltage. An input current approximated nearly as a sinusoidal wave and an unity input power factor can be obtained at an input AC side of the power factor corrector. The conventional control method for controlling the power factor corrector employs a detected output DC voltage for regulating the output DC voltage so as to determine a reference amplitude of the input AC current. Subsequently, a detected AC voltage is employed to determine a reference waveform of the input AC current. The reference waveform multiplies the reference amplitude, thereby obtaining a reference signal of the input AC current. Subsequently, the reference signal and a detected input AC current are operated in a closed-loop control to produce a modulation signal. Finally, the modulation signal is sent to a pulse-width-modulation circuit and a driving circuit to produce a driving signal for the power electronic switch 12. In this way, the conventional control method for the power factor corrector disadvantageously requires to detect three signals, including the output DC voltage, the input AC voltage and the input AC current.

Generally, an AC/DC power converter must employ a power converter having a bridge configuration. Referring now to FIGS. 2a and 2b, schematic circuitry of conventional single-phase AC/DC power converters applied to a single-phase AC power system in accordance with the prior art are illustrated.

Still referring to FIG. 2a, the conventional single-phase AC/DC power converter having a half-bridge configuration is disclosed. The half-bridge configuration of the single-phase AC/DC power converter includes a power electronic switch set 20, a pair of capacitors 21, 22, an inductor 32 and a controller 24. The power electronic switch set 20 has two power electronic switches. The capacitors 21, 22 have the same capacitance. The controller 24 can control the power electronic switch set 20, thereby controlling the AC/DC power converter to receive an input AC current supplied from an AC power source through the inductor 23. Advantageously, the input AC current is approximated nearly as a sinusoidal wave and in phase with the input voltage of the AC power source. Consequently, the harmonics in the AC/DC power converter can be suppressed, the power factor is nearly unity, and the output DC voltage can be controlled.

Referring again to FIG. 2b, the conventional single-phase AC/DC power converter having a full-bridge configuration is disclosed. The full-bridge configuration of the single-phase AC/DC power converter includes a power electronic switch set 30, a capacitor 31, an inductor 32 and a controller 33. The power electronic switch set 30 has four power electronic switches. The controller 33 can control to switch the power electronic switch set 30, thereby controlling the AC/DC power converter to receive an input AC current supplied from an AC power source through the inductor 23. Advantageously, the input AC current is approximated nearly as a sinusoidal wave and in phase with the input voltage of the AC power source. Consequently, the harmonics in the AC/DC power converter can be suppressed, the power factor is nearly unity, and the output DC voltage can be controlled.

Referring to FIG. 3, a schematic circuitry of a conventional three-phase AC/DC power converter applied to a three-phase AC power system in accordance with the prior art is illustrated. The three-phase AC/DC power converter includes a power electronic switch set 40, a capacitor 41, a three-phase inductor set 42 and a controller 43. The power electronic switch set 40 has six power electronic switches. The controller 43 can control to switch the power electronic switch set 40, thereby controlling the AC/DC power converter to produce a balanced three-phase sine-wave currents on the three-phase inductor set 42. Advantageously, phases of the three-phase sine-wave currents are identical with those of the input voltages of a three-phase power source. Consequently, the harmonics in the three-phase AC/DC power converter can be suppressed, and the power factor can be improved to nearly unity.

The conventional control method for both the single-phase AC/DC power converter and the three-phase AC/DC power converter employs a detected output DC voltage for regulating the output DC voltage so as to determine a reference amplitude of the input AC current. Subsequently, a detected AC voltage of the AC power source is employed to determine a reference waveform of the input AC current. The reference waveform multiplies the reference amplitude, thereby obtaining a reference signal of the input AC current. Subsequently, the reference signal and the detected input AC current are operated in closed-loop control to produce a modulation signal. Finally, the modulation signal is sent to a pulse-width-modulation/driving circuit to produce a set of driving signals for the power electronic switch sets 20, 30, 40. In this way, the conventional control method for the single-phase AC/DC power converter and the three-phase AC/DC power converter disadvantageously require to detect three signals, including the output DC voltage, the input AC voltage and the input AC current.

Even though the conventional control methods of the AC/DC power converters can suppress the harmonic components of the input AC current and improve the power factor, the controller must detect the output DC voltage and the input AC voltage to determine the reference signal. Subsequently, the input AC current is detected and operated in closed-loop control to obtain a sine-wave input AC current. Advantageously, the sine-wave input AC current is in phase with the input voltage of the AC power source. However, the conventional control methods for the AC/DC power converter disadvantageously require detecting three signals, including the output DC voltage, the input AC voltage and the input AC current. Accordingly, the control circuit can be complicated and cannot be normally operated due to fluctuations in frequency of the AC power system.

The present invention intends to provide a simplified control method of an AC/DC power converter for suppressing the input current harmonics. The control circuit only detects two signals from the output DC voltage and the input AC current. Additionally, the control method can be normally operated under fluctuations in frequency of the AC power system for controlling an input AC current to approximate nearly as a sinusoidal wave and a unity power factor, and to supply an adjustable output DC voltage.

SUMMARY OF THE INVENTION

The primary objective of this invention is to provide a simplified control method of an AC/DC power converter for suppressing the input current harmonics. The AC/DC power converter can convert energy of an AC power source into a regulated output DC voltage to supply to a DC load. The control method permits the AC/DC power converter without detecting a voltage of an AC power source for simplifying the entire structure. Accordingly, the AC/DC power converter can be normally operated under the variable frequency of the AC power source for controlling an input AC current to approximate nearly as a sinusoidal wave with the performance of high input power factor and low input harmonic current. Consequently, the purposes of harmonic suppression and power factor improvement can be achieved.

The AC/DC power converter in accordance with the present invention employs a control method for permitting the AC/DC power converter only to detect an input AC current and an output DC voltage. The control method can control the AC side of the AC/DC power converter to generate a voltage which is proportional to the input AC current. Thereby, the AC/DC power converter acts as a virtual resistor having a linear resistance characteristic. The detected output DC voltage is used for regulating the output DC voltage so as to determine a value of the virtual resistor for operation of the AC/DC power converter. Accordingly, the input AC current of the AC/DC power converter can be controlled to approximate nearly as a sinusoidal wave with the performance of high power factor and low harmonic distortion. Since the AC/DC power converter acts as a virtual resistor, frequency of the input AC current can be synchronously changed in response to the change in frequency of the AC power source. Consequently, the AC/DC power converter can be normally operated under the variable frequency of an AC power source for controlling the input AC current to approximate nearly as a sinusoidal wave with the performance of high power factor and low harmonic distortion.

Further scope of the applicability of the present invention will become apparent from the detailed description given hereinafter. However, it should be understood that the detailed description and specific examples, while indicating preferred embodiments of the invention, are given by way of illustration only, since various will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
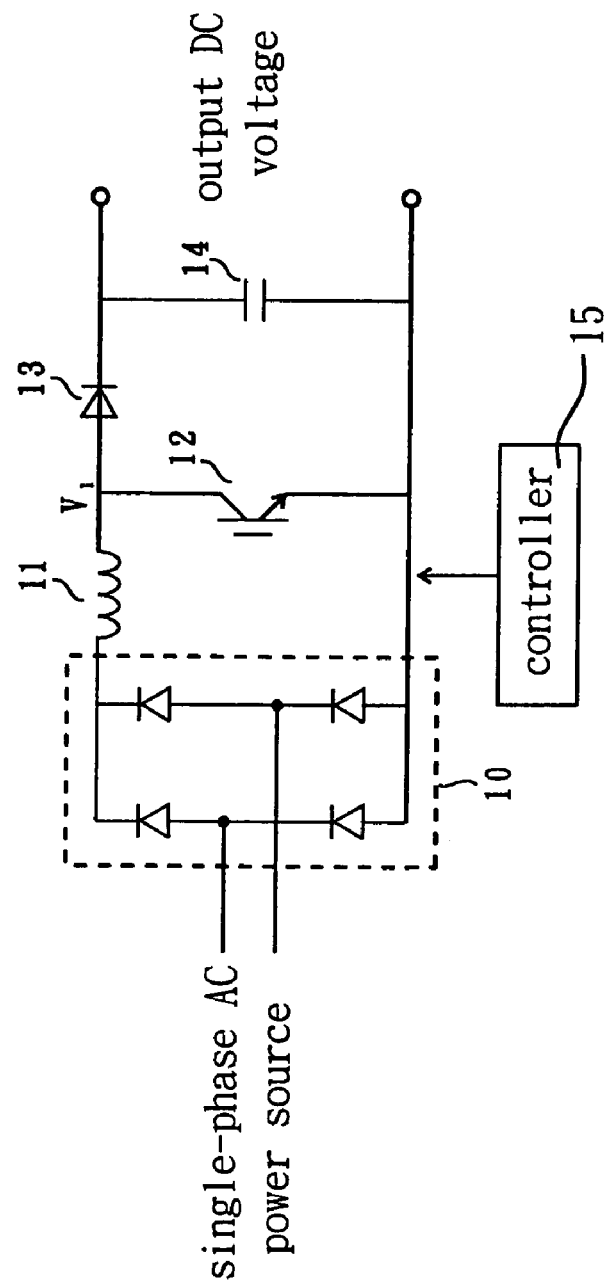
FIG. 1 is a schematic circuitry of a conventional power factor corrector in accordance with the prior art.
Figure 4:
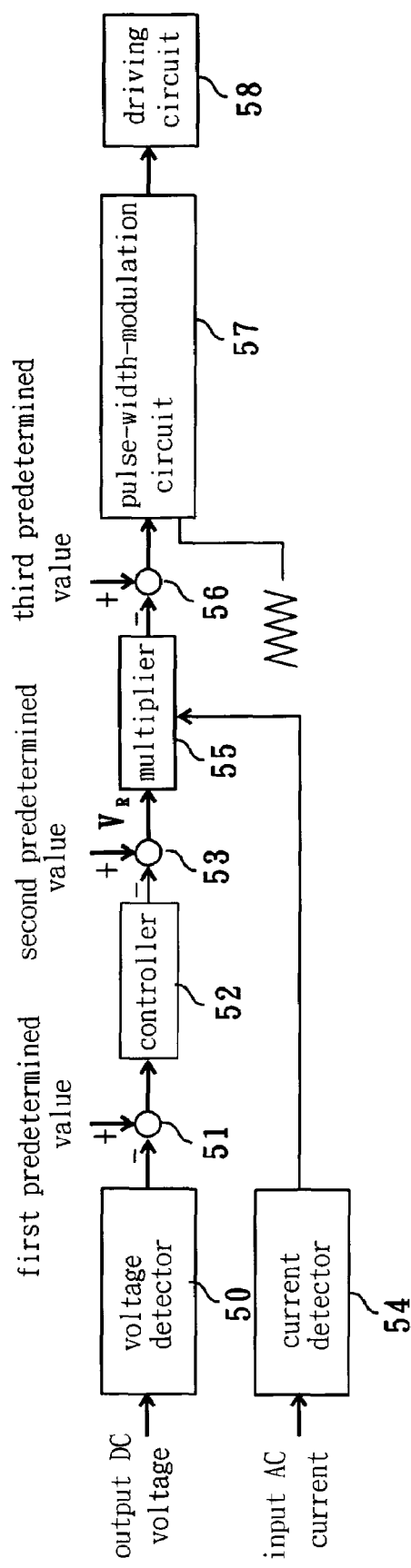
FIG. 4 is a control block diagram illustrating a control circuitry of a harmonic-suppressing AC/DC power converter applied to a power factor corrector in accordance with a first embodiment of the present invention.

Referring now to FIG. 4, a control block diagram of a harmonic-suppressing AC/DC power converter applied to a power factor corrector in accordance with a first embodiment of the present invention is illustrated. The power factor corrector in accordance with the preferred embodiment has similar configuration and similar function as that of the conventional power factor corrector, as shown in FIG. 1, and detailed descriptions may be omitted. In the first embodiment, the control block diagram of the AC/DC power converter includes a voltage-regulation circuit, a current-detecting circuit, a multiplier circuit and a pulse-width-modulation/driving circuit.

Still referring to FIG. 4, the voltage-regulation circuit includes a voltage detector 50, a first subtracter 51, a controller 52 and a second subtracter 53; the current-detecting circuit includes a current detector 54; the multiplier circuit includes a multiplier 55; and the pulse-width-modulation/driving circuit includes a third subtracter 56, a pulse-width-modulation circuit 57 and a driving circuit 58.

Referring back to FIGS. 1 and 4, the voltage detector 50 detects an output DC voltage of the power factor corrector, and then sends to the first subtracter 51 which subtracts the detected output DC voltage from a first predetermined value. Subsequently, the result is sent to the controller 52 to obtain an output, and the output of controller 52 is sent to the second subtracter 53 which subtracts the output of the controller 52 from a second predetermined value. Accordingly, the second subtracter 53 can generate a control signal $V_R$ which provides a value acting as a virtual resistor for the power factor corrector. Preferably, the first predetermined value of the first subtracter 51 is set at an expected value of the output DC voltage, and it can be changed as the desired output DC voltage is changed. Since the power factor corrector is acted as the virtual resistor, the power factor corrector can absorb lesser real power as the value of the resistor is greater; namely, the resistance of the virtual resistor is inversed-proportional to the conversion real power of the power factor corrector. Accordingly, the output of the controller 52 must be subtracted from the second predetermined value by the second subtracter 53. Under these conditions the second predetermined value of the second subtracter 53 equals a maximum value of the virtual resistor as well as a minimum value of the conversion real power of the power factor corrector. Consequently, this ensures a positive value for the input real power of the power factor corrector.

Still referring to FIGS. 1 and 4, the current detector 54 is used to detect an input AC current passing through the inductor 11 of the power factor corrector, as best shown in FIG. 1. Subsequently, the input AC current and the control signal $V_R$ of the second subtracter 53 are sent to the multiplier 55, and then the result is sent to the pulse-width-modulation/driving circuit. With reference to FIG. 1, when the power electronic switch 12 of the power factor corrector is turned on, a voltage V1 across the power electronic switch 12 is nearly zero; conversely, when the power electronic switch 12 of the power factor corrector is turned off, a voltage V1 across the power electronic switch 12 is the same with the output DC voltage of the power factor corrector. Accordingly, an average value of the voltage V1 is reduced as a duty ratio of the power electronic switch 12 is increased, wherein the duty ratio is the ratio of a conduction time to a switching period of the power electronic switch 12; namely, the voltage V1 is inversed-proportional to the duty ratio of the power electronic switch 12. Prior to sending to the pulse-width-modulation/driving circuit, the output of the multiplier 55, must be sent to the third subtracter 56 which can subtract the output of the multiplier 55 from a third predetermined value. Subsequently, the result of the third subtracter 56 is sent to the pulse-width-modulation circuit 57 to operate as a modulation signal. Typically, the pulse-width-modulation circuit 57 can select a high-frequency triangular or saw-tooth wave acting as a carrier wave. In the pulse-width-modulation circuit 57, the modulation signal is compared with the carrier wave so as to generate a high-frequency pulse-width-modulation signal. Finally, an output of the pulse-width-modulation circuit 57 is sent to the driving circuit 58 so as to generate a driving signal for the power electronic switch 12 of the power factor corrector. Preferably, the third predetermined value of the third subtracter 56 is set for a peak value of the high-frequency carrier wave of the pulse-width-modulation circuit 57. When the driving circuit 58 sends the driving signal to drive the power electronic switch 12 of the power factor corrector, the voltage V1 across the power electronic switch 12 is obtained and proportional to the input AC current. Consequently, the power factor corrector can be acted as the virtual resistor, and used to absorb real power from the AC power source and to convert it into a DC power with an adjustable output DC voltage. Furthermore, a current waveform identical with the voltage waveform of the AC power source is generated at the AC side of the power factor corrector so as to adjust the input AC current to be approached to the unity power factor. Since the AC power source supplies an AC voltage with sinusoidal waveform, the input AC current is approximated nearly as a sinusoidal wave which has low harmonic distortion.

Figure 2A:
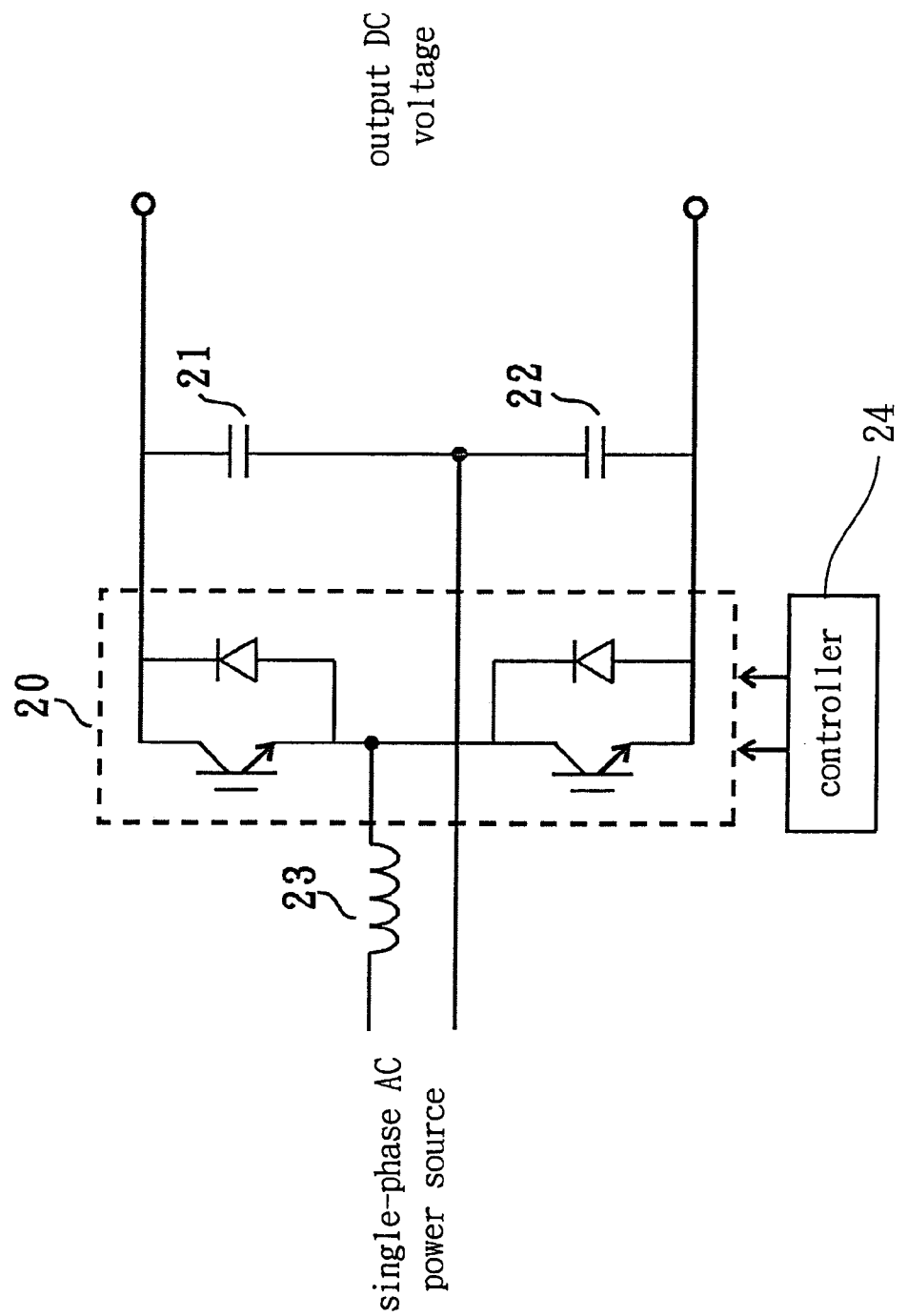
FIG. 2a is a schematic circuitry of a conventional single-phase AC/DC power converter applied to a single-phase AC power system in accordance with the prior art.
Figure 2B:
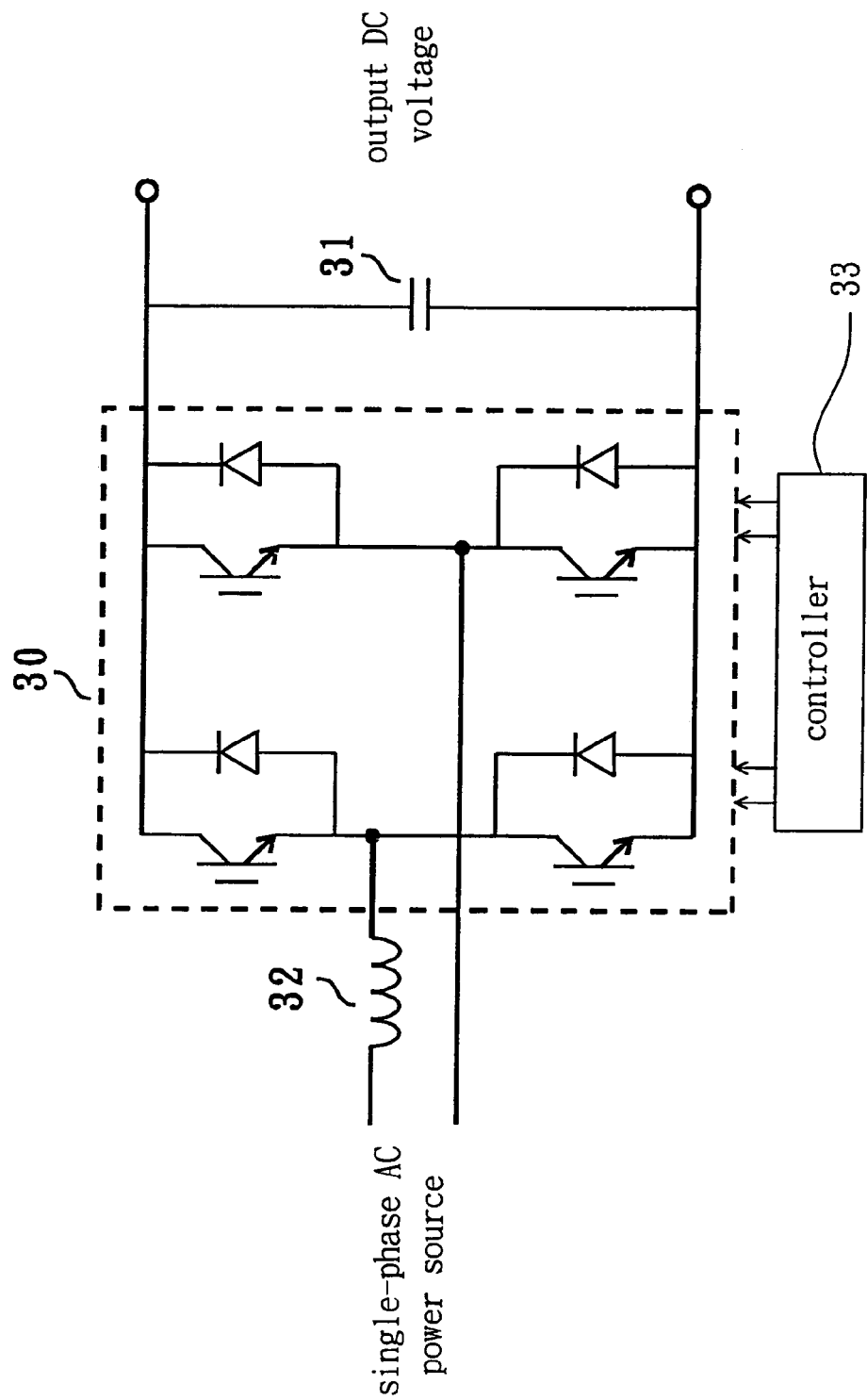
FIG. 2b is a schematic circuitry of another conventional single-phase AC/DC power converter applied to a single-phase AC power system in accordance with the prior art.
Figure 5:
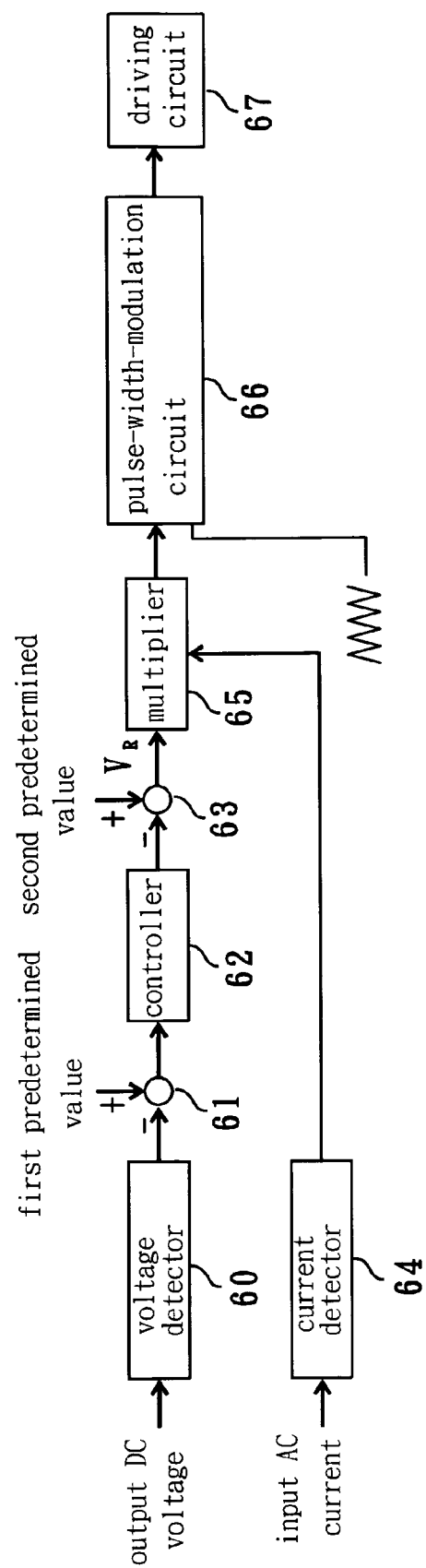
FIG. 5 is a control block diagram illustrating a control circuitry of a harmonic-suppressing single-phase AC/DC power converter employing a half-bridge or full-bridge structure in accordance with a second embodiment of the present invention.

Turning now to FIG. 5, a control block diagram of a harmonic-suppressing single-phase AC/DC power converter employing a half-bridge or full-bridge configuration in accordance with a second embodiment of the present invention is illustrated. The half-bridge or full-bridge configuration of the single-phase AC/DC power converter in accordance with the preferred embodiment has similar configuration and similar function as that of the conventional single-phase AC/DC power converter, as shown in FIGS. 2a and 2b, and detailed descriptions may be omitted. In the second embodiment, the control block diagram of the single-phase AC/DC power converter includes a voltage-regulation circuit, a current-detecting circuit, a multiplier circuit and a pulse-width-modulation/driving circuit.

Still referring to FIG. 5, the voltage-regulation circuit includes a voltage detector 60, a first subtracter 61, a controller 62 and a second subtracter 63; the current-detecting circuit includes a current detector 64; the multiplier circuit includes a multiplier 65; and the pulse-width-modulation/driving circuit includes a pulse-width-modulation circuit 66 and a driving circuit 67.

Referring back to FIGS. 2a, 2b and 5, the voltage detector 60 detects an output DC voltage of the single-phase AC/DC power converter, and then sends to the first subtracter 61 which subtracts the detected output DC voltage from a first predetermined value. Subsequently, the result is sent to the controller 62 to obtain an output, and the output of controller 62 is sent to the second subtracter 63 which subtracts the output of the controller 62 from a second predetermined value. Accordingly, the second subtracter 63 can generate a control signal $V_R$ which provides a value acting as a virtual resistor for the single-phase AC/DC power converter. Preferably, the first predetermined value of the first subtracter 61 is set at an expected value of the output DC voltage, and it can be changed as the desired output DC voltage is changed. Since the single-phase AC/DC power converter acts as the virtual resistor, the single-phase AC/DC power converter can absorb lesser real power as the value of virtual resistor is greater; namely, the resistance of the virtual resistor is inversed-proportional to the conversion real power of the single-phase AC/DC power converter. Accordingly, the output of the controller 62 must be subtracted from the second predetermined value by the second subtracter 63. Under these conditions the second predetermined value of the second subtracter 63 equals a maximum value of the virtual resistor as well as a minimum value of the conversion real power of the single-phase AC/DC power converter. Consequently, this ensures a positive value for the input real power of the single-phase AC/DC power converter.

Still referring to FIGS. 2a, 2b and 5, the current detector 64 is used to detect an input AC current passing through the inductor 23 or 32 of the single-phase AC/DC power converter, as best shown in FIGS. 2a and 2b. The input AC current of the single-phase AC/DC power converter is detected. Subsequently, the input AC current and the control signal $V_R$ of the second subtracter 63 are sent to the multiplier 65, and then the result is sent to the pulse-width-modulation circuit 66 to obtain a modulation signal. Typically, the pulse-width-modulation circuit 66 can select a high-frequency triangular or saw-tooth wave acting as a carrier wave. In the pulse-width-modulation circuit 66, the modulation signal is compared with the carrier wave so as to generate a high-frequency pulse-width-modulation signal. Finally, an output of the pulse-width-modulation circuit 66 is sent to the driving circuit 67 so as to generate the driving signals for the power electronic switch set 20 or 30 of the single-phase AC/DC power converter, as shown in FIGS. 2a and 2b. When the driving circuit 67 sends the driving signals to drive the power electronic switch set 20 or 30 of the single-phase AC/DC power converter, the voltage across the output of power electronic switch set 20 or 30 is proportional to the input AC current. Consequently, the single-phase AC/DC power converter acts as the virtual resistor, and used to absorb real power from the AC power source and to convert it into a DC power with an adjustable output DC voltage. Furthermore, a current waveform identical with the voltage waveform of the AC power source is generated at the AC side of the single-phase AC/DC power converter so as to adjust the input AC current to be approached to the unity power factor. Since the AC power source supplies an AC voltage with sinusoidal waveform, the input AC current is approximated nearly as a sinusoidal wave which has low harmonic distortion.

Figure 3:
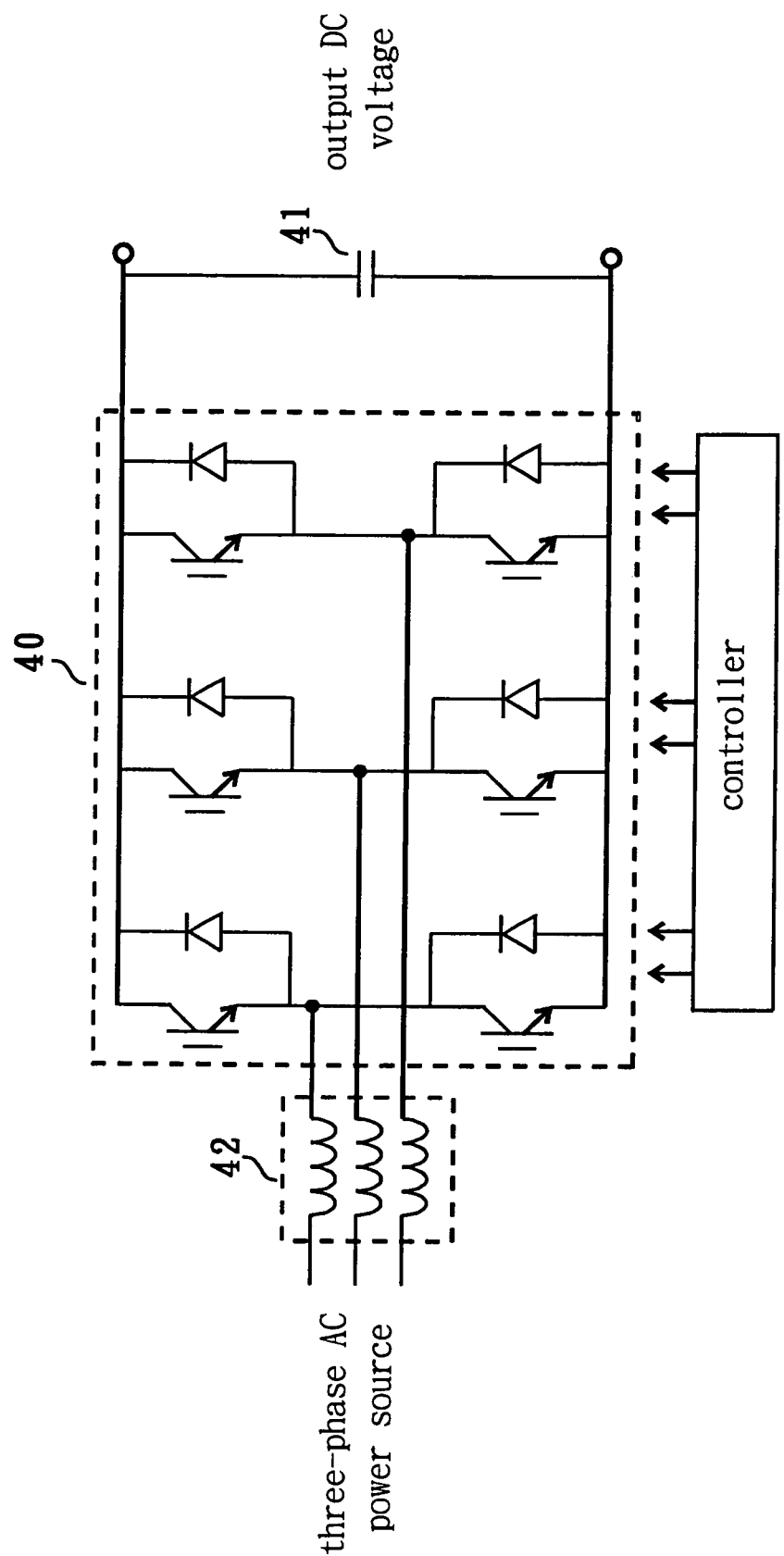
FIG. 3 is a schematic circuitry of a conventional three-phase AC/DC power converter applied to a three-phase AC power system in accordance with the prior art.
Figure 6:
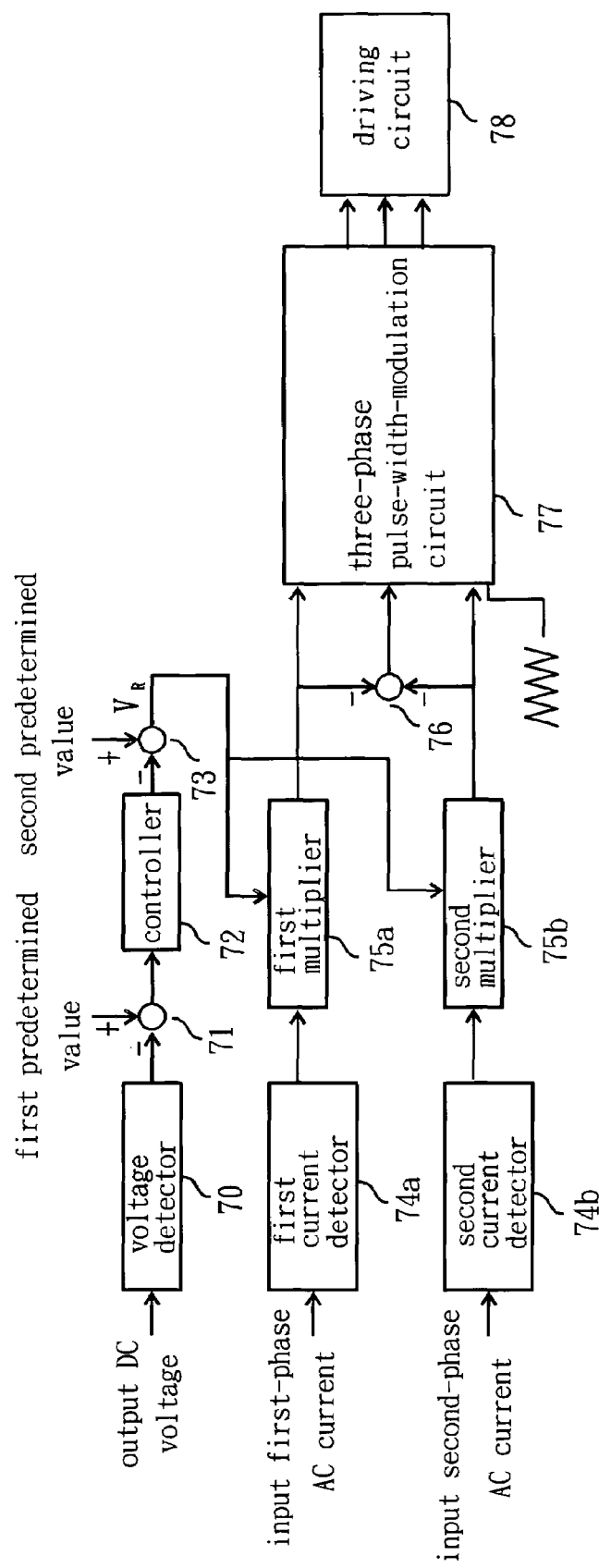
FIG. 6 is a control block diagram illustrating a control circuitry of a harmonic-suppressing single-phase AC/DC power converter in accordance with a third embodiment of the present invention.

Turning now to FIG. 6, a control block diagram of a harmonic-suppressing three-phase AC/DC power converter in accordance with a third embodiment of the present invention is illustrated. The three-phase AC/DC power converter in accordance with the preferred embodiment has similar configuration and similar as that of the conventional three-phase AC/DC power converter, as shown in FIG. 3, and detailed descriptions may be omitted. In the third embodiment, the control circuitry of the three-phase AC/DC power converter includes a voltage-regulation circuit, a current-detecting circuit, a multiplier circuit and a pulse-width-modulation/driving circuit.

Still referring to FIG. 6, the voltage-regulation circuit includes a voltage detector 70, a first subtracter 71, a controller 72 and a second subtracter 73; the current-detecting circuit includes a first current detector 74a and a second current detector 74b; the multiplier circuit includes a first multiplier 75a and a second multiplier 75b; and the pulse-width-modulation/driving circuit includes an inverting adder 76, a three-phase pulse-width-modulation circuit 77 and a driving circuit 78.

Referring back to FIGS. 3 and 6, the voltage detector 70 detects an output DC voltage of the three-phase AC/DC power converter, and then sends to the first subtracter 71 which subtracts the detected output DC voltage from a first predetermined value. Subsequently, the result is sent to the controller 72 to obtain an output, and the output of controller 72 is sent to the second subtracter 73 which subtracts the output of the controller 72 from a second predetermined value. Accordingly, the second subtracter 73 can generate a control signal $V_R$ which provides a value acting as a virtual resistor for the three-phase AC/DC power converter. Preferably, the first predetermined value of the first subtracter 71 is set at an expected value of the output DC voltage, and it can be changed as the desired output DC voltage is changed. Since the three-phase AC/DC power converter acts as the virtual resistor, the three-phase AC/DC power converter can absorb lesser real power as the value of the virtual resistor is greater; namely, the resistance of the virtual resistor is inversed-proportional to conversion real power of the AC/DC power converter. Accordingly, the second subtracter 73 must subtract the output of the controller 72 from the second predetermined value. Under these conditions the second predetermined value of the second subtracter 73 equals a maximum value of the virtual resistor as well as a minimum value of the conversion power of the three-phase AC/DC power converter. Consequently, this ensures a positive value for the input real power of the three-phase AC/DC power converter.

Still referring to FIGS. 3 and 6, the three-phase AC/DC power converter in accordance with the present invention is applied to a three-phase AC power system which supplies a three-phase current, including a first-phase input AC current, a second-phase input AC current and a third-phase input AC current. In the third embodiment, the first current detector 74a and the second current detector 74b are used to detect two of the three-phase input AC currents passing through the three-phase inductor set 42 of the three-phase AC/DC power converter, as shown in FIG. 3, are detected. Subsequently, the input AC currents and the control signal $V_R$ of the second subtracter 73 are sent to the first multiplier 75a and the second multiplier 75b to obtain a first modulation signal and a second modulation signal respectively. The first and second modulation signals are then sent to the pulse-width-modulation/drive. Concretely, the summation of three phase AC currents is zero in the three-phase three-wire AC power system. In order to obtain a third modulation signal for a third phase of the three-phase AC/DC power converter, the first and second modulation signals are sent to the inverting adder 76. Subsequently, the first modulation signal, the second modulation signal and the third modulation signal are sent to the three-phase pulse-width-modulation circuit 77 to obtain pulse-width-modulation signals. Typically, the three-phase pulse-width-modulation circuit 77 can select a high-frequency triangular or saw-tooth wave acting as a carrier wave. In the three-phase pulse-width-modulation circuit 77, the modulation signals are compared with the carrier wave so as to generate high-frequency pulse-width-modulation signals. Finally, outputs of the three-phase pulse-width-modulation circuit 77 are sent to the driving circuit 78 so as to generate the driving signals for the power electronic switch set 40 of the three-phase AC/DC power converter, as shown in FIG. 3. When the driving circuit 78 sends the driving signals to drive the power electronic switch set 40 of the three-phase AC/DC power converter, the voltages across the power electronic switch set 60 are proportional to the input AC currents. Consequently, the single-phase AC/DC power converter acts as the virtual resistor, and used to absorb real power from the AC power source and to convert it into a DC power with an adjustable output DC voltage. Furthermore, a current waveform identical with the voltage waveform of the AC power source is generated at the AC side of the three-phase AC/DC power converter so as to adjust the input AC currents to be approached to the unity power factor. Since the AC power source supply three-phase voltages with sinusoidal waveform, the input AC currents are approximated nearly as sinusoidal wave which has low harmonic distortion.

As has been discussed above, the harmonic-suppressing AC/DC power converter in accordance with the present invention can produce a voltage proportional to the input AC current. This permits the AC/DC power converter acting as a virtual resistor which can be used to absorb real power from the AC power source and to convert it into an adjustable output DC voltage of the output DC voltage to supply to a DC load. Consequently, the purposes of harmonic suppression and power factor improvement can be achieved. Conversely, the conventional control circuit must detect the output DC voltage and the input AC voltage to generate a reference signal. Subsequently, the input AC current is detected and operated in closed-loop control to obtain a sine-wave input AC current, and the input AC current is in phase with the AC voltage of the AC power source. However, the conventional control method for the AC/DC power converter must disadvantageously require detecting the output DC voltage, the input AC voltage and the input AC current. Accordingly, the control circuit can be sophisticated and cannot be normally operated due to the frequency variation of the AC power system.

The control method in accordance with the present invention permits the AC/DC power converter to detect only the input AC current and the output DC voltage for simplifying the entire structure. Additionally, the control method for the AC/DC power converter can omit to detect a voltage of an AC power source, and acts as the virtual resistor which can be normally operated under the power source with frequency variation.

Although the invention has been described in detail with reference to its presently preferred embodiment, it will be understood by one of ordinary skill in the art that various modifications can be made without departing from the spirit and the scope of the invention, as set forth in the appended claims.

What is claimed is:

1. A control method for an AC/DC power converter, comprising the steps of:
   employing a voltage-regulation circuit to detect an output DC voltage from the AC/DC power converter applied to a power factor corrector, and employing the detected output DC voltage to produce a control signal;
   employing a current-detecting circuit to detect an input AC current from the AC/DC power converter;
   employing a multiplier circuit to multiply the control signal of the voltage-regulation circuit and the input AC current of the current-detecting circuit to produce a modulation signal; and
   employing a pulse-width-modulation/driving circuit that includes a third predetermined value and a third subtracter, a pulse-width-modulation circuit and a driving circuit and selects a high-frequency carrier wave to modulate the modulation signal of the multiplier circuit to produce a driving signal for the AC/DC power converter, with the third predetermined value being set for a peak value of the high-frequency carrier wave and the driving signal being used to drive the AC/DC power converter to obtain a voltage which is proportional to the input AC current so that the AC/DC power converter can act as a virtual resistor;
   wherein the acted virtual resistor is connected with an AC power system so that harmonic suppression and power factor improvement can be achieved, and a frequency of the input AC current can be synchronously changed in response to changes in frequency of voltages of the AC power source so that the AC/DC power converter can be normally operated under the AC power source with a frequency variation.

2. A control method for an AC/DC power converter, comprising the steps of:
   detecting an output DC voltage from the AC/DC power converter applied to a power factor corrector, and employing the detected output DC voltage to produce a control signal, detecting an input AC current from the AC/DC power converter;
   multiplying the control signal and the input AC current to produce a modulation signal; and
   modulating the modulation signal by a pulse-width-modulation/driving circuit that includes a third predetermined value and a third subtracter, a pulse-width-modulation circuit and a driving circuit and selects a high-frequency carrier wave to produce a driving signal for the AC/DC power converter, with the third predetermined value being set for a peak value of the high-frequency carrier wave and the driving signal being used to drive the AC/DC power converter to obtain a voltage which is proportional to the input AC current so that the AC/DC power converter can act as a virtual resistor;
   wherein the acted virtual resistor is connected with an AC power system so that harmonic suppression and power factor improvement can be achieved, and a frequency of the input AC current can be synchronously changed in response to changes in frequency of voltages of the AC power source so that the AC/DC power converter can be normally operated under the AC power source with a frequency variation.

* * * * *

UNITED STATES PATENT AND TRADEMARK OFFICE
CERTIFICATE OF CORRECTION

| | |
|---|---|
| PATENT NO. | : 7,450,407 B2 |
| APPLICATION NO. | : 11/332376 |
| DATED | : November 11, 2008 |
| INVENTOR(S) | : Wu et al. |

It is certified that error appears in the above-identified patent and that said Letters Patent is hereby corrected as shown below:

Item (73) please change the assignee listed on the first page of the above-identified patent from "UIS Abler Electronics Co., Ltd." to -- Ablerex Electronics Co., Ltd. --.

Signed and Sealed this

Seventeenth Day of August, 2010

David J. Kappos
*Director of the United States Patent and Trademark Office*